(12) United States Patent
Landy et al.

(10) Patent No.: US 11,573,192 B2
(45) Date of Patent: Feb. 7, 2023

(54) ENHANCED GUIDED WAVE THERMOGRAPHY INSPECTION SYSTEMS AND METHODS OF USING THE SAME

(71) Applicants: Siemens Energy, Inc., Orlando, FL (US); FBS, Inc., State College, PA (US)

(72) Inventors: James F. Landy, Cape Canaveral, FL (US); Paul J. Zombo, Cocoa, FL (US); Cody J. Borigo, Port Matilda, PA (US); Joseph L. Rose, State College, PA (US); Steven E. Owens, State College, PA (US)

(73) Assignees: Siemens Energy, Inc., Orlando, FL (US); FBS, Inc., State College, PA (US)

( * ) Notice: Subject to any disclaimer, the term of this patent is extended or adjusted under 35 U.S.C. 154(b) by 363 days.

(21) Appl. No.: 16/633,855

(22) PCT Filed: Aug. 1, 2017

(86) PCT No.: PCT/US2017/044857
§ 371 (c)(1),
(2) Date: Jan. 24, 2020

(87) PCT Pub. No.: WO2019/027444
PCT Pub. Date: Feb. 7, 2019

(65) Prior Publication Data
US 2020/0240937 A1 Jul. 30, 2020

(51) Int. Cl.
*G01N 29/04* (2006.01)
*G01N 29/06* (2006.01)
(Continued)

(52) U.S. Cl.
CPC ............. *G01N 25/72* (2013.01); *G01N 29/04* (2013.01); *G01N 29/043* (2013.01); *G01N 29/0654* (2013.01); *G01N 29/34* (2013.01)

(58) Field of Classification Search
CPC .. G01N 29/043; G01N 29/0654; G01N 25/72; G01N 29/32; G01N 29/04; G01N 2291/0422
(Continued)

(56) References Cited

U.S. PATENT DOCUMENTS

| 7,122,801 B2* | 10/2006 | Favro | G01N 29/228 250/341.1 |
| 7,231,826 B2* | 6/2007 | Bossi | G01N 29/28 73/620 |

(Continued)

FOREIGN PATENT DOCUMENTS

| CN | 101713756 A | 5/2010 |
| CN | 105842348 A | 8/2016 |

(Continued)

OTHER PUBLICATIONS

Electronic Theses and Dissertations for Graduate School, A Novel Actuator Phasing Method for Ultrasonic De-icing of Aircraft Structures, Borigo, Oct. 2014. (Year: 2014).*
(Continued)

*Primary Examiner* — Jacques M Saint Surin

(57) ABSTRACT

Non-destructive inspection systems (10) and methods for inspecting structural flaws that may be in a structure (15) based on guided wave thermography. The method may include sweeping a frequency-phase space to maximize ultrasonic energy distribution across the structure while minimizing input energy, e.g., via a plurality of actuators. The system may include transducer elements (12, 14, 16, 17) configured to predominantly generate shear horizontal-type guided waves in the structure to maximize thermal response from any flaws.

14 Claims, 13 Drawing Sheets

(51) Int. Cl.
*G01N 29/34* (2006.01)
*G01N 25/72* (2006.01)
(58) Field of Classification Search
USPC .......................................................... 73/606
See application file for complete search history.

(56) References Cited

U.S. PATENT DOCUMENTS

| | | | |
|---|---|---|---|
| 9,380,008 B2* | 6/2016 | Ramarao | G06F 9/546 |
| 9,410,853 B2 | 8/2016 | Zombo et al. | |
| 9,645,012 B2* | 5/2017 | Marsh | G06T 7/40 |
| 9,964,503 B2* | 5/2018 | Lucon | G01N 29/069 |
| 10,473,624 B2* | 11/2019 | Philtron | G01N 29/14 |
| 2002/0126579 A1 | 9/2002 | Gualtieri | |
| 2004/0089812 A1* | 5/2004 | Favro | G01N 21/71 |
| | | | 250/341.6 |
| 2004/0194532 A1 | 10/2004 | Lally et al. | |
| 2013/0327148 A1* | 12/2013 | Yan | G01N 29/341 |
| | | | 73/628 |
| 2013/0343424 A1* | 12/2013 | Zombo | G01K 11/22 |
| | | | 374/117 |
| 2014/0278193 A1 | 9/2014 | Breon et al. | |
| 2015/0109412 A1 | 4/2015 | Suh et al. | |
| 2016/0023772 A1 | 1/2016 | Borigo et al. | |
| 2016/0109412 A1 | 4/2016 | Borigo et al. | |
| 2017/0030848 A1 | 2/2017 | Borigo et al. | |

FOREIGN PATENT DOCUMENTS

| | | |
|---|---|---|
| EP | 1582867 A2 | 10/2005 |
| JP | 2003509686 A | 3/2003 |
| JP | 2003509691 A | 3/2003 |
| JP | 2011145146 A | 7/2011 |
| KR | 20160031119 A | 3/2016 |
| UA | 31098 U | 3/2008 |
| WO | 0120303 A1 | 3/2001 |
| WO | 0120319 A1 | 3/2001 |

OTHER PUBLICATIONS

PCT International Search Report and Written Opinion dated Apr. 20, 2018 corresponding to PCT Application No. PCT/US2017/044857 filed Aug. 1, 2017.

Yang, Bo et al: "Defect detection and evaluation of ultrasonic infrared thermography for aerospace CFRP composite"; School of Automation Science and Electrical Engineering, Bethang University, Beijing 100191. PR China; journal homepage: www.elsevier.com/locate/infrared,Elsevier, 2013, 60, 166-173.

Schwarz, Michael et al: "Characterising Metal-CFRP Hybrid Structures By Nondestructive Testing Methods"; Proceedings of the 5th International Conference on Intergrity-Reliability-Failure; pp. 128-134 / Jul. 28, 2016.

* cited by examiner

ENHANCED GUIDED WAVE THERMOGRAPHY INSPECTION SYSTEMS AND METHODS OF USING THE SAME

TECHNICAL FIELD

The present disclosure relates generally to the field of non-destructive inspection systems, and more particularly, to guided wave thermography inspection systems for inspecting structural flaws of a structure, which may be located in the structure.

BACKGROUND

Thermographic imaging has proven to be a generally useful technique for detecting structural abnormalities. For example, when exciting a structure with flaws using relatively high ultrasonic power, frictional heating may be generated at the flaws. The flaws can then become detectable under a thermal infrared camera. However, structurally weak regions that may be part of the structure may be vulnerable when subjected to such high ultrasonic power, which could lead to break up of the structure being inspected. Thus, there is a need for further improvements in connection with systems and methods for inspecting a structure.

Therefore, a need remains for further improvements in connection with systems and methods for inspecting a structure.

SUMMARY

It should be appreciated that the present inventor has recognized the above limitations, and now discloses a new solid state welding process, e.g., magnetic pulse welding, for additive manufacturing of superalloys.

In one embodiment, a system for inspecting a structure is provided. The system may include at least one controller operably connected to at least one transducer element and at least one thermal imaging sensor. The transducer element may be configured to predominantly generate shear horizontal-type guided sonic or ultrasonic waves throughout the structure, which may be effective to cause a thermal response upon impingement with a structural flaw. It should be appreciated that the flaw may be located in the structure. The thermal imaging sensor may be arranged and configured to sense the thermal response indicative of the flaw, and the controller may be operably configured to control the sensing of the thermal response by the thermal imaging sensor and the phasing, and also to control the parameters of the signal being applied or transmitted to the transducer element.

In yet a further exemplary embodiment, the system may include a plurality of transmitting transducer elements to transmit guided sonic or ultrasonic waves throughout the structure, wherein the energy is effective to cause a thermal response upon impingement with a structural flaw. The system may also include a means for simultaneously applying a plurality of signals to the plurality of transducer elements. The signals may include independent relative phase such that a plurality of predetermined phasing vectors may be implemented. The system may also include at least one thermal imaging sensor arranged to sense the thermal response indicative of the flaw, and a controller operatively connected to the transducer elements and sensors to, e.g., control the sensing of the thermal response by the thermal imaging sensor and the phasing, and to control the plurality of predetermined phasing vectors in order to provide enhanced ultrasonic energy coverage across the structure by means of varying the ultrasonic vibration response.

In yet another exemplary embodiment, a method of inspecting a structure is provided. The method may include the step of: transmitting guided sonic or ultrasonic waves in a structure by applying a plurality of signals to a plurality of transmitting transducer elements. The method also includes controlling a relative phase of one or more of the plurality of signals in accordance with a first predetermined phasing vector. The method includes sensing a thermal response indicative of a flaw in the structure, where the energy within a vicinity of the flaw is sufficient to cause the thermal response. Additionally, the method includes the step of repeating the process for a predetermined plurality of phasing vectors, wherein the objective is to provide enhanced ultrasonic energy coverage across the structure by varying the ultrasonic vibration response.

DETAILED DESCRIPTION

It should be appreciated that aspects of the exemplary inventive guided wave thermography system disclose herein may be implemented by any appropriate processor system using any appropriate programming language or programming technique. The system can take the form of any appropriate circuitry, such as may involve a hardware embodiment, a software embodiment or an embodiment comprising both hardware and software elements. In one embodiment, the system may be implemented by way of software and hardware (e.g., processor, sensors, etc), which may include but is not limited to firmware, resident software, microcode, etc.

Furthermore, parts of the processor system can take the form of a computer program product accessible from a processor-usable or processor-readable medium providing program code for use by or in connection with a processor or any instruction execution system. Examples of processor-readable media may include non-transitory tangible processor-readable media, such as a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The present inventors have identified the limitations of existing acoustic/ultrasonic thermography systems and recognized a need for systems and methods that may be selectively optimized to efficiently cause thermal responses at structural flaws with relatively low excitation power.

The present inventors propose innovative utilization of sonic or ultrasonic guided waves for performing thermography inspection on a variety of structures, which in one non-limiting application may comprise components of a combustion turbine engine, such as blades, vanes, etc. Ultrasonic guided waves comprise multi-mode structural resonances that propagate in a bounded structure, which effectively functions as a waveguide.

Aspects of the present invention utilize at least one actuator to deliver acoustic sonic or ultrasonic energy throughout the structure, which can cause a thermal response (e.g., heating) upon impingement with a structural flaw which may be located in the structure. As elaborated in greater detail below, the thermal response induced by the sonic or ultrasonic energy can be detected with a thermal imaging system, which may be effective for high flaw detection sensitivity while utilizing at least one of frequency sweeping, actuator phasing, and shear energy excitation in order to minimize the ultrasonic energy introduced to the structure under test.

For general background information, reference is made to U.S. Pat. No. 9,410,853, which is incorporated by reference herein in its entirety.

Figure 1:
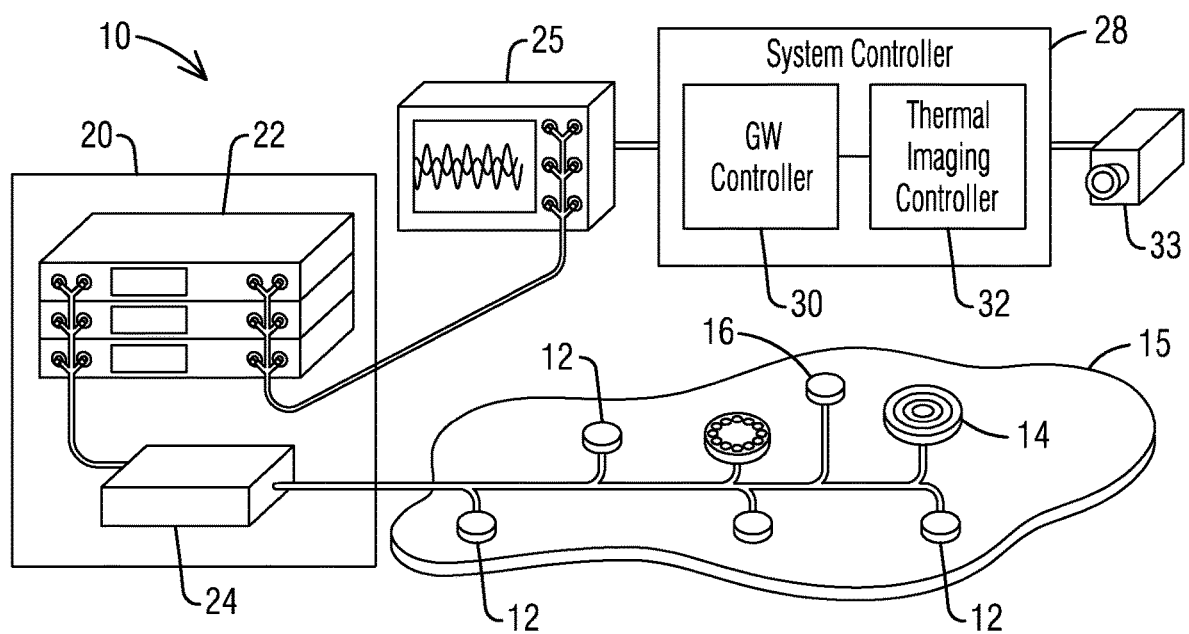
FIG. 1 is a schematic representation of an exemplary embodiment of a guided wave thermography system, in accordance with disclosure provided herein.

Referring now to the drawings wherein the showings are for purposes of illustrating embodiments of the subject matter herein only and not for limiting the same, FIG. 1 illustrates a schematic representation of a guided wave thermography system 10, which may be used to practice aspects of the present disclosure.

Figure 2:
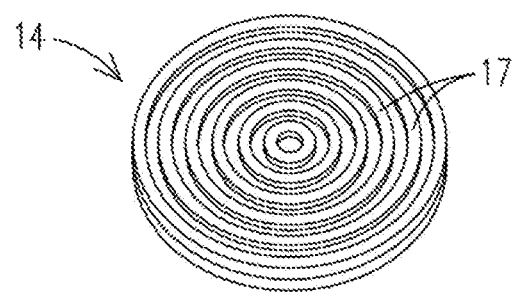
FIG. 2 is an isometric view of an exemplary embodiment of a multi-element transmitting-transducer, which may be used for transmitting ultrasonic guided waves through a structure being inspected, and in accordance with the disclosure provided herein.
Figure 3:
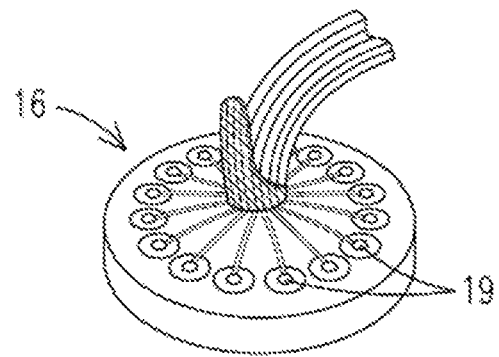
FIG. 3 is an isometric view of another exemplary embodiment of a multi-element transmitting-transducer.

In one exemplary embodiment, the system 10 may include one or more transmitting-transducers coupled to a structure 15 (an object being inspected) for transmitting ultrasonic guided waves through the structure. The transmitting-transducers may be arranged as a distributed array of single-element transmitting-transducers 12; or may comprise multi-element transmitting-transducers, such as an annular array transducer 14 comprising a plurality of individually-actuated transmitting elements 17 (as may be better appreciated in FIG. 2); or a circular array transducer 16 comprising a plurality of individually-actuated transmitting elements 19 (as may be better appreciated in FIG. 3). The transmitting-transducers could include, but are not limited to piezo-stack transducers, piezo-ceramic bars, disks, rings, or cylinders, magnetostrictive transducers, electromagnetic acoustic transducers (EMATs), controlled mechanical impact devices, piezo-composites, etc. It will be appreciated that aspects of the present disclosure are not limited to any particular configuration for the transmitting-transducers, or to any particular shape of structure 15. Accordingly, the configuration of transmitting-transducers, or the shape of structure 15 as illustrated in the figures should be construed in an example sense and not in a limiting sense.

The system 10 may further include a signal conditioner 20, which in one non-limiting embodiment may be configured to provide appropriate signal amplification by way of one or more amplifier circuits 22, and impedance matching by way of one or more impedance matching networks 24 to electrical signals which may be respectively applied to transmitting-transducers 12, 14, 16 from a signal generator 25 (e.g., a multi-channel signal generator). A system controller 28 may include a guided wave controller 30, (labeled GW controller) which may be configured to control signal generator 25, such as may be configured to control one or more signal parameters of one or more signals that may be applied to the one or more transmitting-transducers to generate the ultrasonic guided waves transmitted through structure 15. Non-limiting examples of signal parameters that may be controlled to determine signal characteristics for the signals that may be applied to the one or more transmitting-transducers may comprise a phase delay, a frequency, and a combination of phase delays and frequencies, such as may involve a phase delay sweep, frequency sweep or both. The system controller 28 may further include a thermal imaging system comprising a thermal imaging controller 32 to control a thermal imaging sensor 33 (e.g., an infrared (IR) camera) configured to sense a thermal response indicative of the flaw.

It will be appreciated that for thermography to effectively detect structural flaws, the magnitude of certain vibration variables (e.g., in-plane displacement, shear stress, etc.) appropriate to the geometry and/or the spatial orientation of a given structural flaw, should be set sufficiently high in the immediate vicinity of the given flaw to ensure that a sufficient thermal response (e.g., heating) is induced.

As will be appreciated by one skilled in the art, during ultrasonic vibration of plate-like or other waveguide-like structures, the magnitude of the generated vibration fields can vary throughout such structures. For example, such variations may occur both through the thickness of the structure and as a function of distribution relative to the other dimensions of the structure. Accordingly, the variation in the vibration fields can lead to regions of relatively high stress, displacement, etc., as well as to regions of practically no stress, displacement, etc. In order for a structural flaw located in a given region of the structure to be appropriately acousto-thermally excited, the pertinent vibration variables of the vibration field delivered to such a region should have sufficiently high amplitude. As suggested above, the pertinent vibration variables may vary depending on the geometry of the structural flaw and/or the spatial orientation of the flaw.

In one non-limiting embodiment, control of phase delay and/or frequency (e.g., phase delay and/or frequency sweep) may be performed on the signals (e.g., continuous signals) applied to the one or more transmitting-transducers coupled to structure 15. This phasing action when performed on the transmitting-transducers may be conducive to enhanced spatial selectivity for the locations of low or high sonic or ultrasonic energy throughout such structures (e.g., enhanced spatial selectivity for the location of nodes for enhancing the intensity of the sonic or ultrasonic energy delivered to a given region of the structure, and the location of anti-nodes for attenuating the intensity of the sonic or ultrasonic energy delivered to other regions of the structure). In one non-limiting embodiment, the phasing can be performed in conjunction with frequency sweeping to provide maximum spatial selectivity to intensity variation throughout the structure of the generated vibration fields.

The combination of signal phasing and frequency sweeping effectively allows spanning of a multi-dimensional phasing-frequency space. This allows for an ability to form a relatively greater range of vibration states—which for example may be selectively formed throughout the structure being inspected—than would be feasible if operating at a single frequency, or just performing frequency sweeping. These vibration states allow substantial versatility regarding selectivity of different vibration fields throughout the thickness of the structure, such as displacement wavestructure, stress wavestructure, vibration mode shape, etc. This is conducive to an increased likelihood of detecting a broad range of structural flaws, regardless of structural flaw geometry, depth, and other flaw characteristics.

Figure 4:
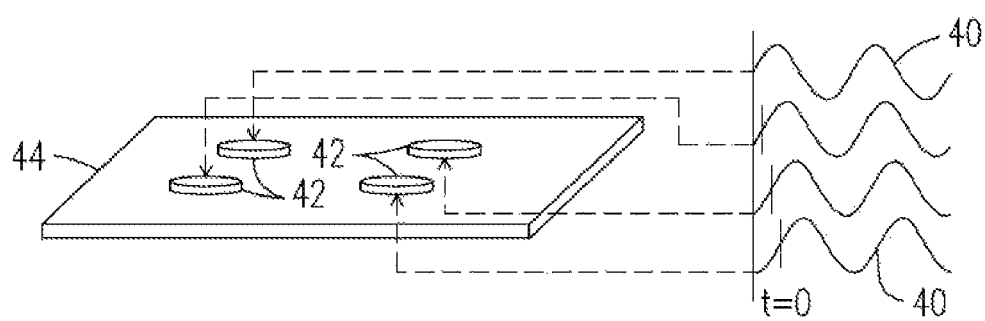
FIG. 4 is a schematic representation of an exemplary embodiment for implementing phasing delays to excitation signals applied to transmitting-transducers to generate the ultrasonic guided waves, in accordance with the disclosure provided herein.

FIG. 4 is a schematic representation of one non-limiting embodiment for implementing a respective phase delay on signals 40 respectively applied to single-element transmitting transducers 42 distributed on a structure 44 being inspected. In this embodiment, continuous wave signals 40 may be respectively applied to transmitting transducers 40 each having a different phase delay. Without limiting aspects of the present disclosure to any particular theory of operation, it is believed that in this case the effect of phasing may be to excite various natural modes of the structure by changing a loading distribution across its surface. Any combination of phase delay values applied to the plurality of transmitting transducers 40 may be referred to as a "phasing vector". For general background information in connection with phasing, reference is made to U.S. Pat. No. 8,217,554 and U.S. patent application Ser. No. 14/329,426, both disclosures of which are incorporated by reference herein in their entirety.

Significant improvements in response can be obtained by utilizing guided wave energy concentration via a phased transducer array with the appropriate frequency and phasing. One example of this is provided in FIGS. 5 and 6, which compare two finite element models of an identical structure upon which identical actuator arrays are installed. Structure 35 (FIG. 5) features the cumulative stress field coverage achieved by means of frequency sweeping, in which the darker areas 37 indicate higher stresses and the lighter areas 38 indicate lower stresses. Alternatively, structure 36 (FIG. 6) features the cumulative stress field coverage achieved by means of frequency sweeping, in which the darker areas 37 indicate higher stresses and the lighter areas 38 indicate lower stresses. The benefit of actuator phasing is, as illustrated here, is that a much greater variety of vibration states can be induced, which allow the maximum stresses, or other measure of energy concentration, to be distributed across the structure to a greater degree without increasing the ultrasonic power induced in the structure at any given time.

Figure 5:
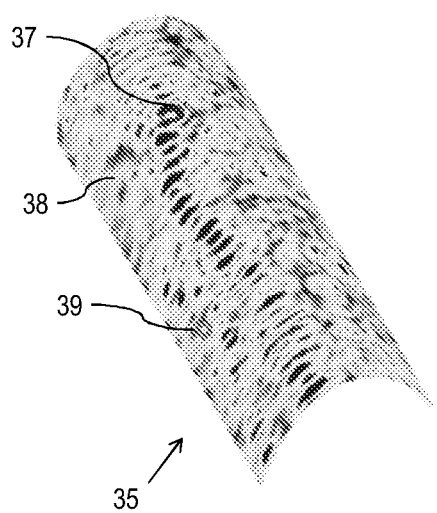
FIGS. 5 and 6 illustrates a comparison of the net ultrasonic energy fields induced upon an identical structure without phasing in FIG. 5 and with phasing in FIG. 6.
Figure 6:
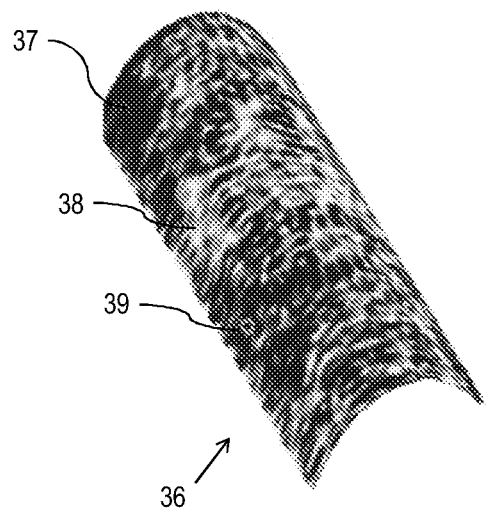

With respect to FIGS. 5 and 6, consider a case in which a defect 39 requires a certain minimum level of local ultrasonic energy concentration to be detectable by a thermal imaging system. A conventional acoustic thermography system may apply at least one actuator to structure 35 (FIG. 5) and excite the at least one actuator over a range of frequencies. Based on the bandwidth of the actuator, the geometry of the structure, and location at which it is coupled to the structure, the maximum ultrasonic energy concentration in structure 35, considering all frequencies at which the actuator is excited, may be as shown in FIG. 5. In this case, the local ultrasonic energy concentration at the location of defect 35 never exceeds the minimum threshold and the defect is undetectable. One conventional way to address this limitation is by increasing the overall ultrasonic input power, which at some point will increase the amplitude of the energy field of FIG. 5, but will not change its distribution. As a result of this increase in overall ultrasonic energy, the darker high-intensity regions 37 will be exposed to very high ultrasonic energy levels, which may damage the structure. In many cases, the overall ultrasonic energy cannot be increased due to limitations of the actuator or amplification systems, in which case defect 39 is undetectable.

However, by implementing the method and system described herein, various actuator phasing combinations can be applied across a plurality of actuators along with frequency sweeping in order to greatly increase the number of and variety of ultrasonic vibration states of structure 36 (FIG. 6), in which the net ultrasonic energy coverage is greatly improved. Utilizing this approach, the defect 39 becomes detectable without increasing the overall power level and without necessarily exposing any regions of the structure 36 to unnecessarily high energy levels.

Figure 7:
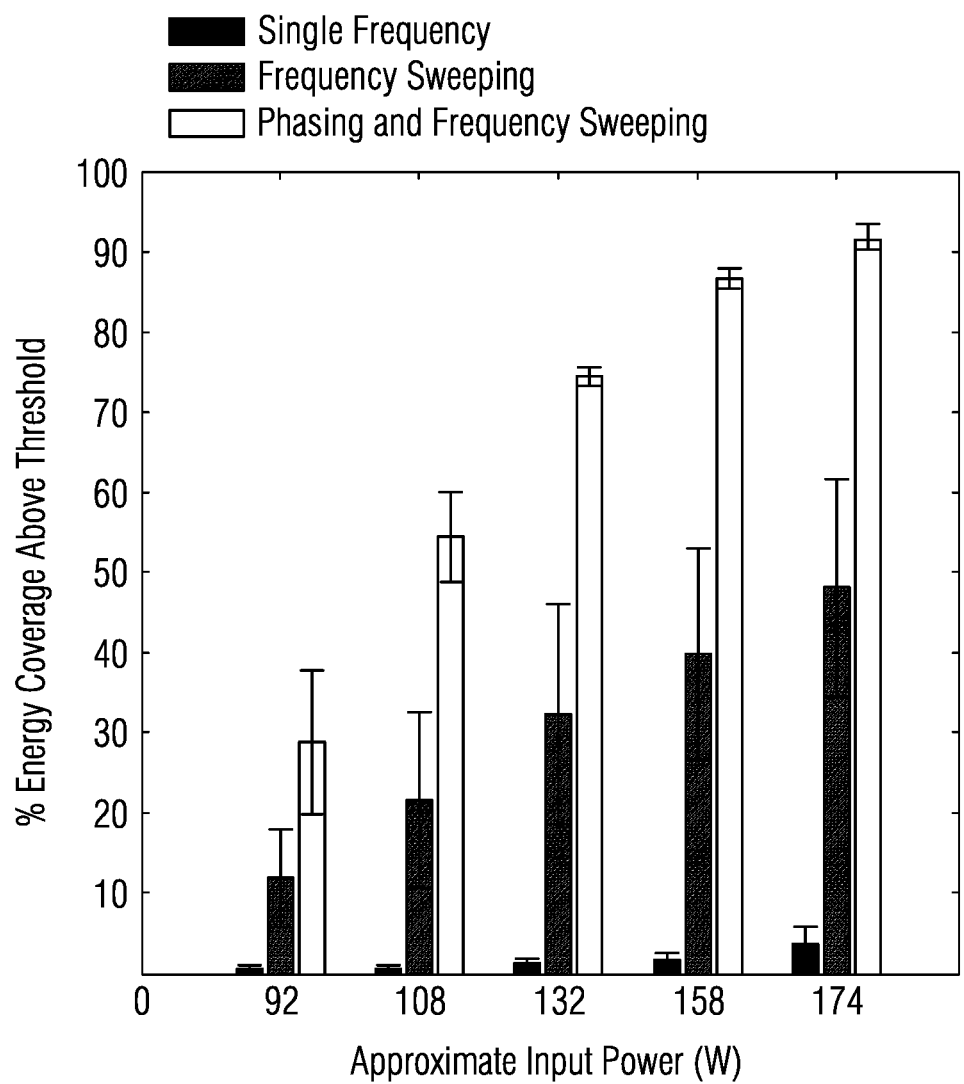
FIG. 7 illustrates a plot of experimental results demonstrating the ultrasonic energy coverage above a threshold level using single-frequency actuation, frequency sweeping, and frequency sweeping with phasing.

The improvement in ultrasonic energy coverage by implementing one embodiment of the frequency sweeping and phasing system and method described herein is quantified in FIG. 7, which plots experimental data comparing the ultrasonic energy coverage over a structure using three methods of actuator excitation: 'single frequency', 'frequency sweeping', and 'phasing and frequency sweeping' at various input power levels. This graph demonstrates that for a given input power level, much greater energy coverage above the predetermined threshold level is achievable by implementing a frequency sweeping and phasing excitation method.

Figure 8:
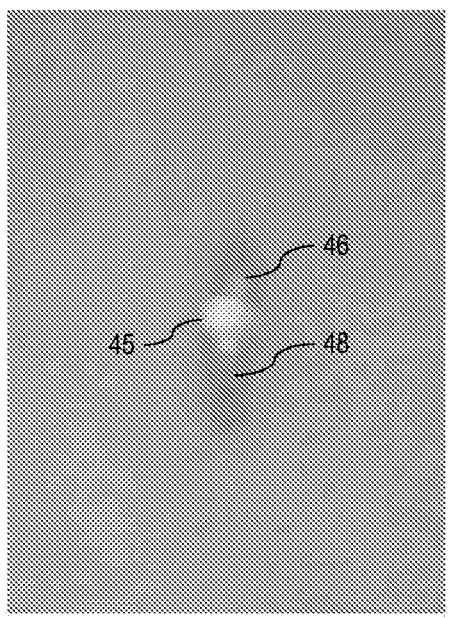
FIGS. 8 and 9 illustrate comparative examples of thermal responses in a structure having two structural flaws disposed proximate an opening in the structure, where the response illustrated in FIG. 8, was driven with an appropriate excitation frequency phasing combination and shows both structural flaws, while the response illustrated in FIG. 9 provides a better indication of the first flaw but misses the second of the flaws.
Figure 9:
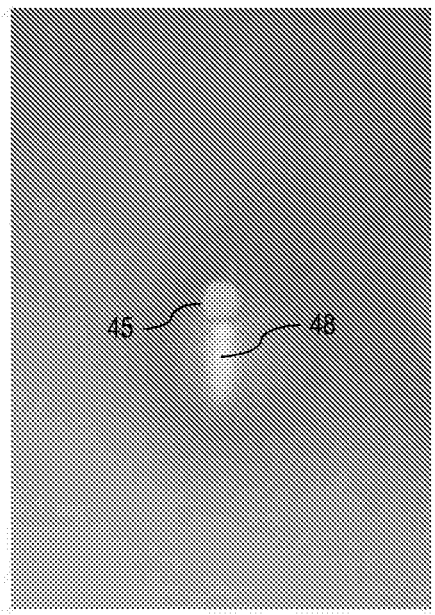

It should be noted that the appropriate frequency and phasing combination can excite certain structural flaws and not others. One example of this phenomenon is depicted in FIGS. 8 and 9, in which two cracks 46 and 48 are present above and below hole 45, respectively. A first frequency and phasing combination applied to the actuators in FIG. 8 yield sufficient thermal excitation at both cracks 46 and 48 to be detected with moderate intensity. In comparison, a second frequency and phasing combination applied to the same actuators in FIG. 9 yield insufficient thermal excitation to detect crack 46, but the thermal intensity at crack 48 is much higher than in FIG. 8, in which the first frequency and phasing combination was applied. Therefore, the appropriate frequencies of excitation in conjunction with appropriate actuator phasing can be used to thermally excite flaws in the structure that may be otherwise undetected by conventional acoustic thermography systems and methods.

In another non-limiting embodiment, in lieu of continuous signals, respective streams of pulses may be applied to the one or more single or multi-element transmitting-transducers coupled to the structure being inspected. In this embodiment, transient guided waves may be propagated throughout the structure to avoid causing steady-state vibration. This may be accomplished by applying relatively narrow, high-power excitation pulses. It is contemplated that a similar effect (e.g., no steady-state vibration) may be achieved in applications involving large and/or attenuative structures, in which there may be insufficient interaction with the boundaries of the structure to induce structural resonance. These excitation pulses may be repeated at a repetition frequency sufficient to cause the accumulation of thermal energy in the vicinity of a given structural flaw to allow the thermal imaging system to detect the structural flaw. As will be appreciated by one skilled in the art, appropriate imaging techniques may be utilized to increase the signal-to-noise ratio and detect relatively weak thermal gradients.

To implement the phasing system and method most efficiently, the band over which the frequency is swept must be adjusted for each new phasing combination, as the forced vibrational spectrum is shifted by applying phasing. The optimal frequency band can be selected by means of an impedance analyzer sweep or by analyzing the forward and reflected power measured between the amplifiers and the actuators. For further details regarding frequency optimization as part of a phasing system and method, reference is made to doctoral dissertation by C. J. Borigo, titled A Novel Actuator Phasing Method for Ultrasonic De-Icing of Aircraft Structures, available from The Pennsylvania State University (2014), the dissertation of which is incorporated by reference herein in its entirety.

In one non-limiting embodiment, it is contemplated that the sensing of the thermal response by the thermal imager may be synchronized (e.g., frequency lock, phase lock) relative to a frequency of the stream of excitation pulses which may be applied to the one or more transmitting transducers. It is further contemplated that such a frequency may comprise a time-varying frequency (e.g., a chirping frequency). This temporal synchronicity is believed to enhance a signal-to-noise ratio in connection with the sensing of the thermal response by the thermal imager. In one example embodiment, the synchronicity may be performed relative to an expected energization time of a region being excited in response to the guided ultrasonic wave.

One further aspect of the present disclosure is the utilization of shear actuators to generate shear horizontal-type guided waves in a structure, as well as the vibration states induced by the waves in the structure if the excitation signal is applied for a sufficient period of time. Shear horizontal-type guided waves are a class of guided wave modes that can exist in plate-like structures. The characteristics of a shear-horizontal guided wave mode and the means by which it may be excited for the purposes of the present disclosure are described below.

Figure 10:
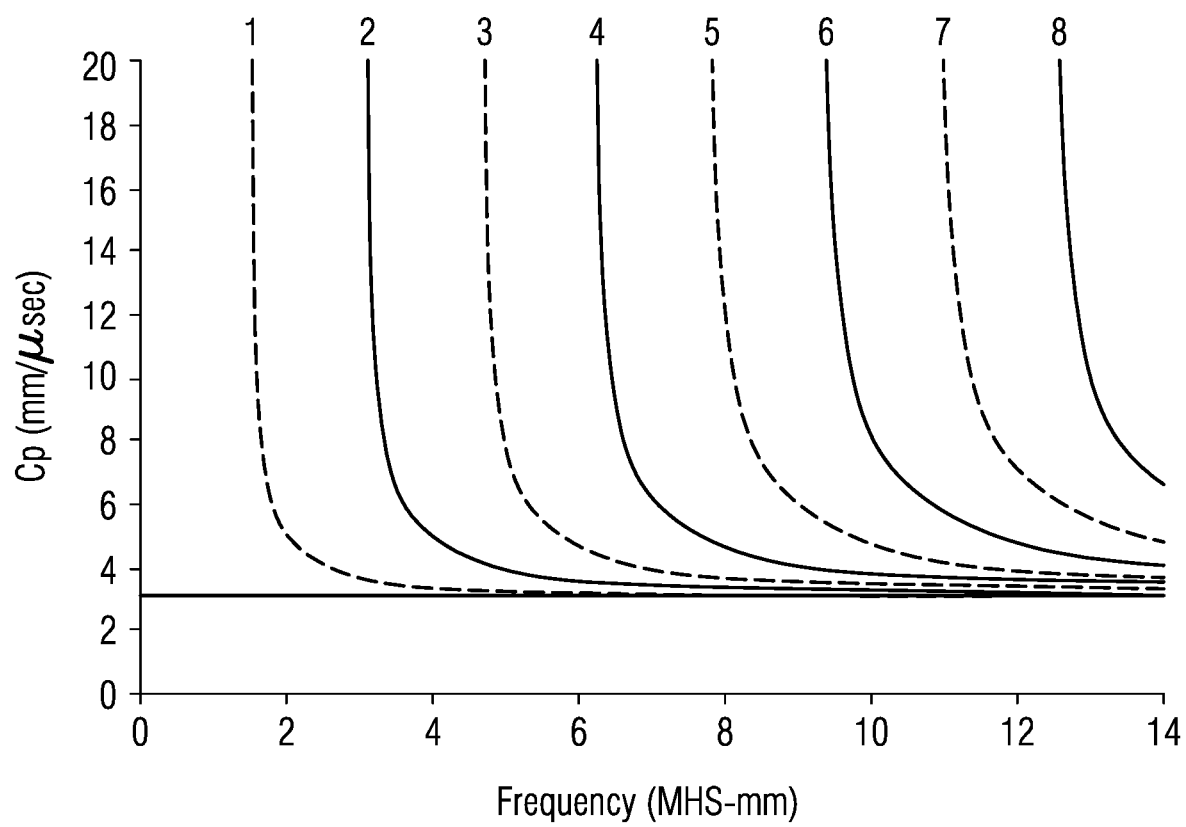
FIG. 10 illustrates a non-limiting example of shear horizontal wave dispersion curves illustrating a respective relationship between phase velocity and guided wave mode and frequency for a given structure.

More generally, guided waves may be defined as elastic waves propagating in a medium (a waveguide structure) in which distinct wave modes can exist that satisfy the boundary conditions of the waveguide structure. Guided waves differ from traditional bulk waves at least by the fundamental fact that an infinite number of distinct wave modes may exist with wavestructures (e.g., displacement, stress, energy, etc. distributions through the thickness of the waveguide) that may vary as a function of mode and/or frequency. Dispersion curves, such as the ones shown in FIG. 10, illustrate a relationship between phase (or group) velocity and mode and frequency for a given structure. Each waveguide has its own unique set of dispersion curves, which may be useful for identifying various mode-frequency possibilities in a waveguide. Wavestructure variations can yield substantial flexibility for utilizing guided waves, since, for example, particular wave mode and/or frequency combinations can be selected with desirable properties through the thickness of the structure.

Figure 11:
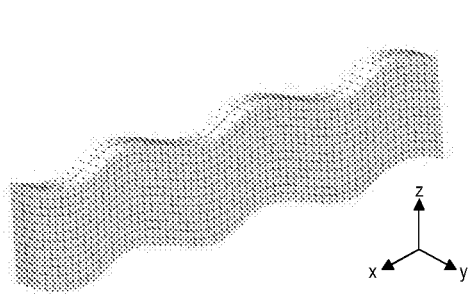
FIGS. 11-13 illustrates non-limiting examples of guided waves comprising different vibration characteristics, including A-type waves in FIG. 11, S-type waves in FIG. 12, and SH-type waves in FIG. 13.
Figure 12:
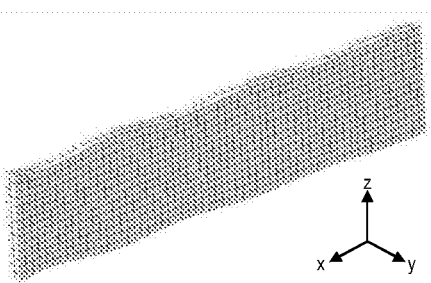
Figure 13:
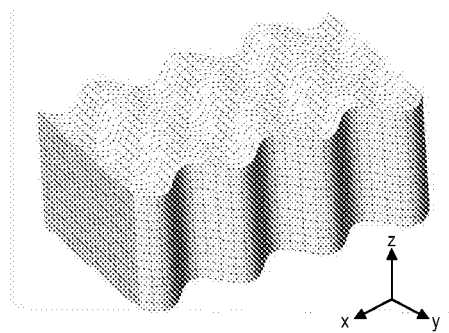

Examples of three guided wave modes comprising different vibration characteristics are shown in FIGS. 11-13. The deformation of a plate-like structure with an antisymmetric (A-type) guided wave mode propagating through it is shown in cross-section in FIG. 11. Alternatively, the deformation of a plate-like structure with a symmetric (S-type) guided wave mode propagating through it is shown in cross-section in FIG. 12. Note that the vibration in FIGS. 11 and 12 is solely in the x-z plane. Finally, the deformation of a plate-like structure with a shear horizontal (SH-type) guided wave mode propagating through it is shown in cross-section in FIG. 13; note that the vibration in FIG. 13 is solely in the y direction.

Furthermore, it can be shown that for shear horizontal waves in isotropic, homogeneous plates of uniform thickness, the only non-zero stresses induced by the waves are the in-plane shear stresses $\tau xz$ and $\tau yz$. Therefore, such waves induce pure shear into the structure for the case of isotropic, homogeneous plates of uniform thickness. It will be appreciated that in the case of structures that do not meet the definition of isotropic, homogeneous plates of uniform thickness, the stress components of shear horizontal-type waves are generally predominantly shear instead of pure in-plane shear. For further details on guided waves, reference is made to textbook by J. L. Rose, Titled Ultrasonic Guided Waves in Solid Media, available from Cambridge University Press, New York, N.Y. (2014), which textbook is incorporated by reference herein in its entirety.

Figure 14:
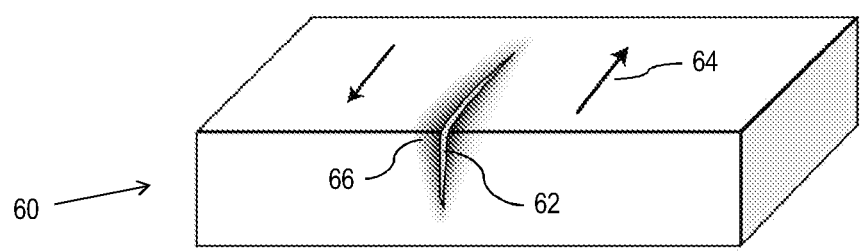
FIG. 14 illustrates a crack generating heat due to shearing friction.

It will be appreciated that for thermography to effectively detect structural flaws, the magnitude of certain vibration variables (e.g., in-plane displacement, shear stress, etc.) appropriate to the geometry and/or the spatial orientation of a given structural flaw, should be set sufficiently high in the immediate vicinity of the given flaw to ensure that a sufficient thermal response (e.g., heating) is induced. As illustrated in FIG. 14, the in-plane shearing 64 is ideal for generating surface rubbing at a crack 62 in a structure 60, which in turn generates a detectable level of heat 66. The shearing-induced friction illustrated in FIG. 14 can occur for cracks perpendicular to the local surface plane of the part as well as cracks or delaminations parallel to the local surface plane of the part. Furthermore, the efficiency of heat generation 66 at crack 62 is dependent on the relative orientation of the crack and the shearing motion 64 induced by the ultrasonic vibration. The phasing and frequency sweeping described above can address this by varying the vibration field, as illustrated in FIGS. 5 and 6.

The inventors note that the transient propagating guided wave solution for shear horizontal-type ultrasonic guided waves is not directly applicable to the steady-state ultrasonic vibration solution, but the two may be intimately related.

Conventional acoustic thermography technology utilizes a piezo-stack actuator with an acoustic horn actuator, including those produced under the brand name Branson. These types of actuators generate predominantly flexural (A-type) and compressional vibrations (S-type), which are composed only of in-plane and out-of-plane particle displacements that are less well-suited to induce crack heating in many cases than the shearing energy of the SH-type modes. Less efficient crack heating means more energy is required to gain the same level of detectability and thus the chances of unintentional part damage are higher. Additionally or alternatively, in some non-limiting embodiments of the present disclosure, shear horizontal-type energy may be introduced into the structure by means of d15 piezoelectric shear actuators.

Figure 15:
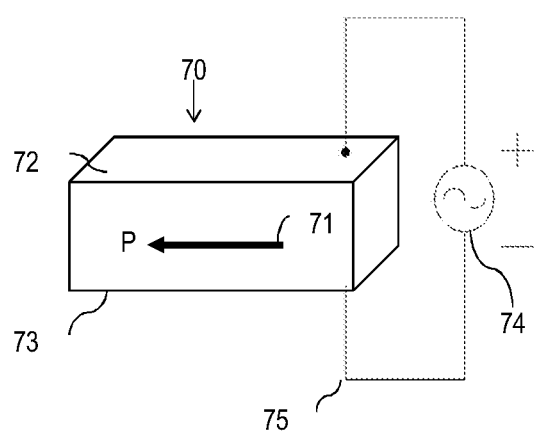
FIG. 15 illustrates a non-limiting example of a laterally-polarized piezoelectric shear bar element.
Figure 16:
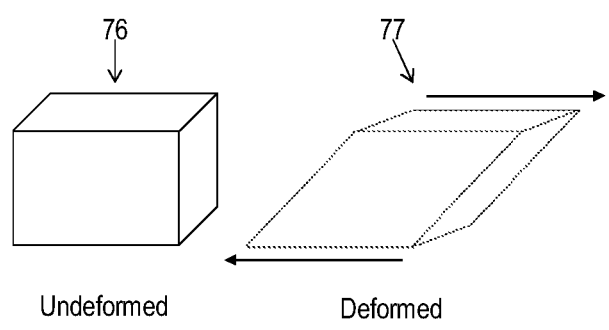
FIG. 16 illustrates a possible deformation mode of a laterally-polarized piezoelectric shear bar element.

In one non-limiting embodiment, the piezoelectric d15 shear actuator may be a "shear bar", in which the d15 piezoelectric coefficient is employed in a laterally-polarized piezoceramic block 70 such as the one illustrated in FIG. 15. Here the piezoceramic element 70 is polarized in the direction indicated by the arrow 71 and an electric potential is applied across the electrode faces 72 and 73 using the alternating voltage source 74 attached with leads 75. As illustrated in FIG. 16, when the voltage is applied to the undeformed element 76, it shears into a deformed state 77. The various dimensions and the piezoceramic material selected for the bars can all be adjusted to suit the specific requirements of the application as will be understood by people of ordinary skill in the art.

Figure 17:
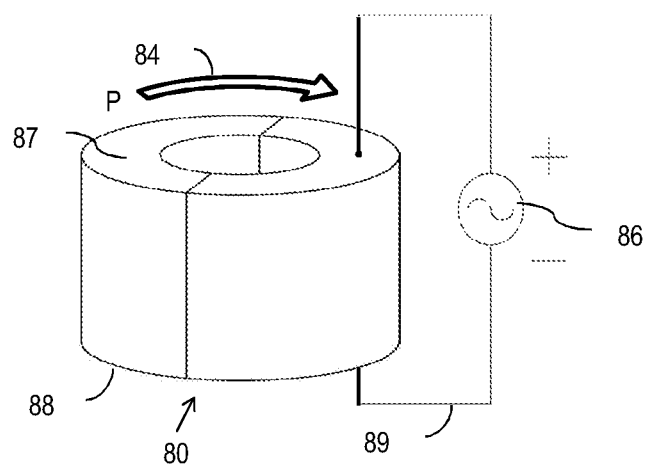
FIG. 17 illustrates an exemplary embodiment of a circumferentially-polarized piezoelectric shear ring element.
Figure 18:
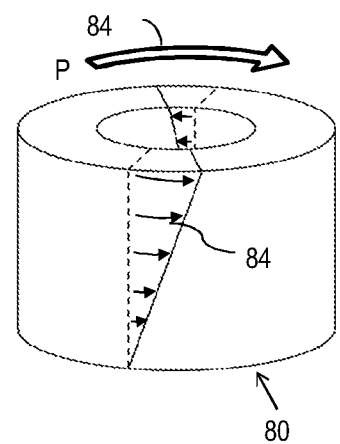
FIG. 18 illustrates a possible deformation mode of a circumferentially-polarized piezoelectric shear ring element.

In a second non-limiting embodiment, the piezoelectric d15 shear actuator is a "shear ring", in which the d15 piezoelectric coefficient is employed in a circumferentially-polarized piezoceramic ring 80 such as the one illustrated in FIG. 17. The shear ring element is fabricated from two half rings that are polarized quasi-circumferentially, in accordance with arrow 84 and subsequently bonded together to form a full ring element 80, which can be excited with voltage source 86 applied to the upper and lower electrode surfaces 87 and 88 via leads 89. The torsional vibration 84 of the shear ring element under a voltage applied by the source 86 is illustrated in FIG. 18. This torsional deformation effectively excites SH guided waves omnidirectionally when coupled to a structure. The inner and outer radii, the thickness, and the piezoceramic material selected for the rings can all be adjusted to suit the specific requirements of the application as will be understood by people of ordinary skill in the art. Additional variations upon this transducer design also are possible, and the specific embodiment detailed herein is non-limiting and used as one example of an omnidirectional piezoelectric d15 shear ring element for SH-type guided wave generation in accordance with some embodiments. Additional embodiments may include shear rings that are fabricated from more than two segments, shear rings that are poled through the radius instead of the thickness dimension, and shear rings that are polygonal instead of truly circular.

Figure 19:
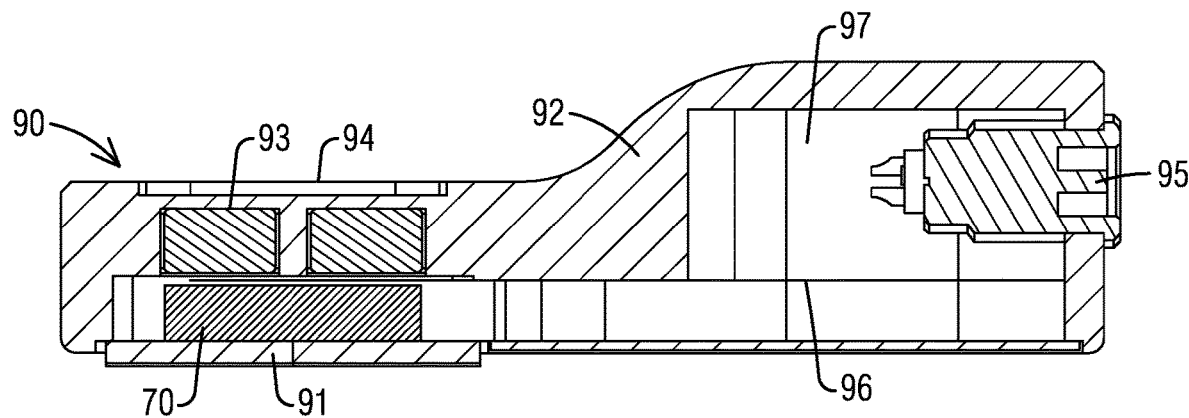
FIGS. 19 and 20 illustrate exemplary embodiments of a shear transducer as one part of a guided wave thermography system in accordance with the disclosure provided herein.
Figure 20:
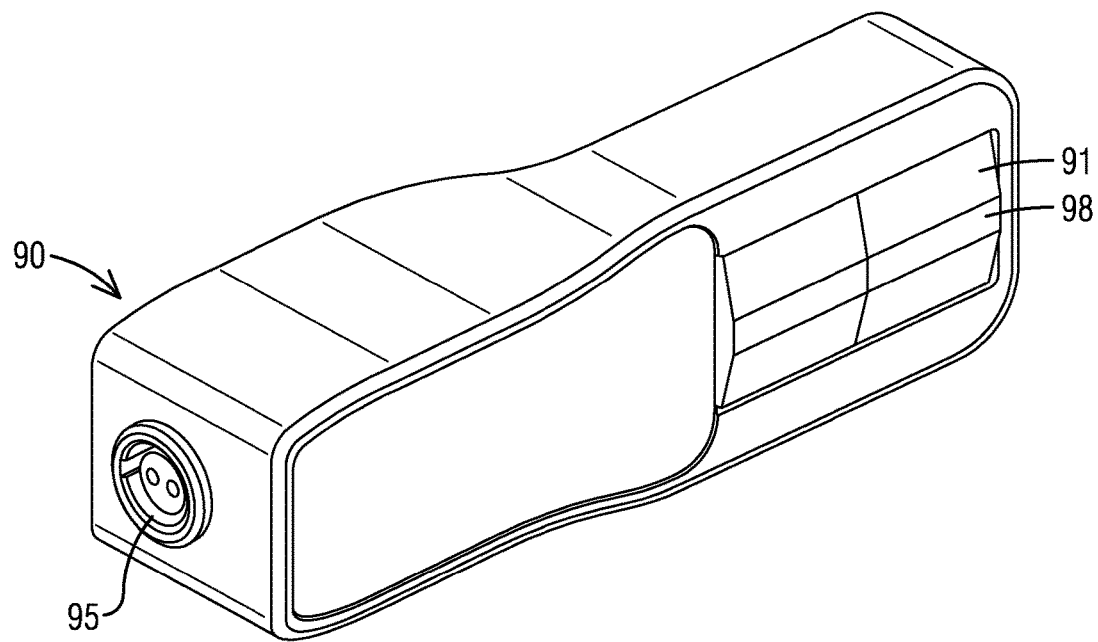

The piezoelectric shear transducer elements described above may be one or more components within a transducer module, such as the non-limiting example shown in cross-section in FIGS. 19 and 20. In the embodiment shown in FIG. 19, transducer module 90 is comprised of a housing 92 that contains at least one piezoelectric shear bar element 70 bonded to at least one faceplate 91, which is comprised of a metallic or ceramic material and allows the ultrasonic shear energy to be efficiently transmitted from element 70 to the structure under test by means of mechanical pressure coupling. Module 90 is further comprised of a cavity 97 through which a connector 95 is electrically connected to the upper and lower electrode faces 72 and 73 by means of a flexible circuit 96 or jumper wires. In some embodiments, module 90 may be further comprised of magnets 93 that aid in retaining a clamping device in pocket 94 for the purposes of coupling the module to the structure under test. FIG. 20 is another view of the module 90 shown in cross-section in FIG. 21. Here the faceplate 91 is shown with the rectangular coupling surface 98. In additional non-limiting embodiments, similar module design may be adapted to accommodate a shear ring transducer, in which case the coupling surface 98 and faceplate 91 would be circular instead of rectangular.

It should be noted that another advantage of utilizing one or more piezoelectric shear elements as part of a guided wave thermography system is that they are much smaller than the piezo-stack transducers utilized as part of conventional acoustic thermography systems. This affords the opportunity to conduct in situ inspections or perform inspections with fewer limitations due to access issues.

Additional embodiments may include shear horizontal-type excitation by means of magnetostrictive or EMAT (electromagnetic acoustic transducer) devices, as will be understood by those of ordinary skill in the art.

Figure 21:
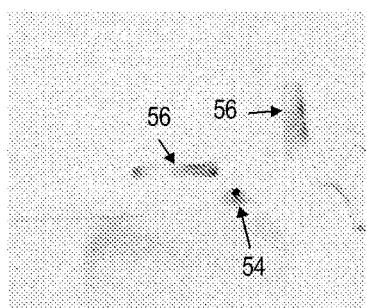
FIGS. 21-23 illustrates thermal images of crack defects in a turbine blade structure that were generated with an exemplary embodiment of the guided wave thermography system in accordance with the disclosure provided herein.
Figure 22:
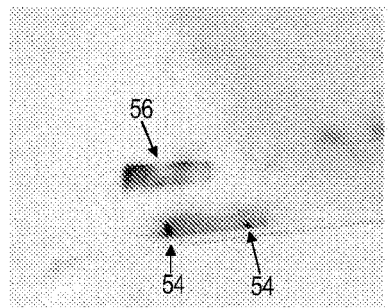
Figure 23:
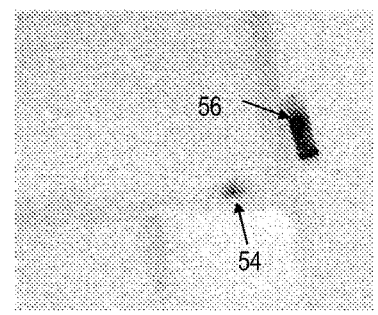

FIGS. 21-23 provide examples of thermal images collected using one embodiment of the invention. The images are of turbine blades with crack-like defects along the trailing edge. In all three images, the cracks 54 are indicated by the dark areas of higher temperature indicated by the arrows. The rectangular areas 56 are calibration strips.

While specific embodiments have been described in detail, those with ordinary skill in the art will appreciate that various modifications and alternative to those details could be developed in light of the overall teachings of the disclosure. Methods and systems based on guided wave thermography for non-destructively inspecting structural flaws that may be present in a structure are described herein. Such systems may include the ability to sweep a frequency-phase space in order to maximize ultrasonic energy distribution across the structure while minimizing input energy by means of a plurality of actuators. Moreover, such systems may include transducer elements configured to predominantly generate shear horizontal-type guided waves in the structure to maximize thermal response from the flaws. In the foregoing detailed description, various specific details are set forth in order to provide a thorough understanding of such embodiments.

However, those skilled in the art will appreciate that embodiments of the present disclosure may be practiced without these specific details, that the present disclosure is not limited to the depicted embodiments, and that the present disclosure may be practiced in a variety of alternative embodiments. In other instances, methods, procedures, and components, which would be well-understood by one skilled in the art have not been described in detail to avoid unnecessary and burdensome explanation. Furthermore, various operations may be described as multiple discrete steps performed in a manner that is helpful for understanding embodiments of the present invention.

However, the order of description should not be construed as to imply that these operations need be performed in the order they are presented, nor that they are even order dependent unless otherwise do described. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated. It should be noted that the use of articles "a" or "an" does not exclude a plurality.

We claim:

1. A system comprising:
a controller operably connected to one or more of a plurality of piezoelectric shear transducer elements, a means for applying signals to the transducer elements (30), and at least one thermal imaging sensor,
wherein each of the plurality of piezoelectric shear transducer elements is operably configured to transmit guided sonic or ultrasonic waves throughout a structure to cause a thermal response upon impingement with a flaw of the structure,
wherein the guided sonic or ultrasonic waves are predominantly shear horizontal-type guided waves in the structure,
wherein the thermal imaging sensor is operably arranged to sense the thermal response indicative of the flaw;
wherein one or more of the signals applied via the means for applying a plurality of signals includes an independent relative phase such that a plurality of predetermined phasing vectors may be implemented, and
wherein the controller is configured to control the sensing of the thermal response and a phasing, and to control the plurality of predetermined phasing vectors in order to provide enhanced ultrasonic energy coverage across the structure.

2. The system of claim 1, wherein the enhanced ultrasonic energy is provided by means of varying the ultrasonic vibration response.

3. The system of claim 1, wherein the plurality of signals are applied simultaneously to the plurality of piezoelectric transducer elements.

4. The system of claim 1, further comprising a means for determining an electromechanical impedance of the plurality of piezoelectric shear transducer elements.

5. The system of claim 1, further comprising a means for monitoring a forward power and a reflected power between at least one signal source and the plurality of piezoelectric shear transducer elements.

6. The system of claim 1, wherein the relative phase of the signals is limited to an integer multiple of 180° and a number of signal sources is limited to two.

7. The system of claim 1, wherein the plurality of piezoelectric shear transducer elements are configured into a multi-element array transducer.

8. A method comprising:
A) transmitting guided sonic or ultrasonic energy from the one or more transducer elements to a structure wherein one or more of the one or more transducer elements predominately generates shear-horizontal waves in the structure, and in response to one or more signals applied to at least one of the transducer elements;
B) controlling a relative phase of the applied signals based on a first predetermined phasing vector;
C) impinging upon a structural flaw during the guided sonic or ultrasonic energy transmission; and
D) sensing a thermal response indicated of the flaw and resulting from the guided sonic or ultrasonic energy impingement in a vicinity of the flaw,
wherein steps A-D are repeated for a predetermined plurality of phasing vectors to provide enhanced ultrasonic energy coverage across the structure.

9. The method of claim 8 further comprising varying a center frequency of the applied signals over a predetermined range of frequencies by applying a series of pulses having different center frequencies to provide enhanced ultrasonic energy coverage across the structure by varying a vibration response of the transducer elements and structure and maximizing the vibration response.

10. The method of claim 8 further comprising varying a center frequency of the plurality of signals over a predetermined range of frequencies by applying a swept-frequency signal to provide enhanced ultrasonic energy coverage across the structure by at least one of: varying a vibration response of the transducer elements and structure or maximizing the vibration response of the transducer elements and structure.

11. The method of claim 8 wherein the relative phase of the applied signals is limited to an integer multiple of 180°.

12. The method of claim 8 further comprising
monitoring a forward power and a reflected power between at least one signal source and the plurality of transducer elements; and
determining at least one center frequency of the signals based on the forward and reverse power.

13. The method of claim 8 further comprising:
determining an electromechanical impedance of the one or more transducer elements; and determining at least one center frequency of the signals based on the impedance.

14. The method of claim 8 further comprising:
sensing a plurality of thermal response; and
combining the plurality of sensed thermal responses in accordance with the phasing vector to generate a composite thermal image of the structure.

* * * * *